United States Patent [19]
Vazquez et al.

[11] 3,833,004
[45] Sept. 3, 1974

[54] BALLOON CATHETER HAVING SINGLE FERRULE SUPPORT FOR BALLOON BINDINGS

[75] Inventors: Jose A. Vazquez, Anasco, P.R.; Lawrence W. Blake, Costa Mesa, Calif.

[73] Assignee: American Hospital Supply Corporation, Evanston, Ill.

[22] Filed: Oct. 26, 1973

[21] Appl. No.: 409,854

[52] U.S. Cl................ 128/349 B, 29/447, 264/230
[51] Int. Cl..................... A61m 25/00, B23p 11/02
[58] Field of Search.......... 128/208, 246, 344, 348, 128/349 B, 351, 349 BV; 29/447; 264/230

[56] References Cited
UNITED STATES PATENTS

| | | | |
|---|---|---|---|
| 2,930,377 | 3/1960 | Cowley | 128/344 |
| 3,448,739 | 6/1969 | Stark et al. | 128/348 |
| 3,528,869 | 9/1970 | Dereniuk | 128/349 B |
| 3,634,924 | 1/1972 | Blake et al. | 29/447 |
| 3,640,282 | 2/1972 | Kamen | 128/351 |

*Primary Examiner*—Aldrich F. Medbery
*Attorney, Agent, or Firm*—Lee R. Schermerhorn

[57] ABSTRACT

A catheter tube is extruded from a thermoplastic material having a memory characteristic. An end portion of the tube is heated sufficiently to soften the plastic and permit the end portion to be drawn out to a reduced diameter. A single rigid metal ferrule having a window opening therein is placed on the reduced end portion and this portion is heated again but in relaxed condition, causing it to re-expand and lock the ferrule in place. A balloon inflation opening is formed in the catheter tube communicating with a lumen therein through the window opening in the ferrule. A sleeve of balloon material is secured by bindings over end portions of the ferrule beyond opposite ends of the window opening. The ferrule provides rigid support for the balloon bindings so that the lumen or lumens in the catheter are not constricted by the bindings.

2 Claims, 3 Drawing Figures

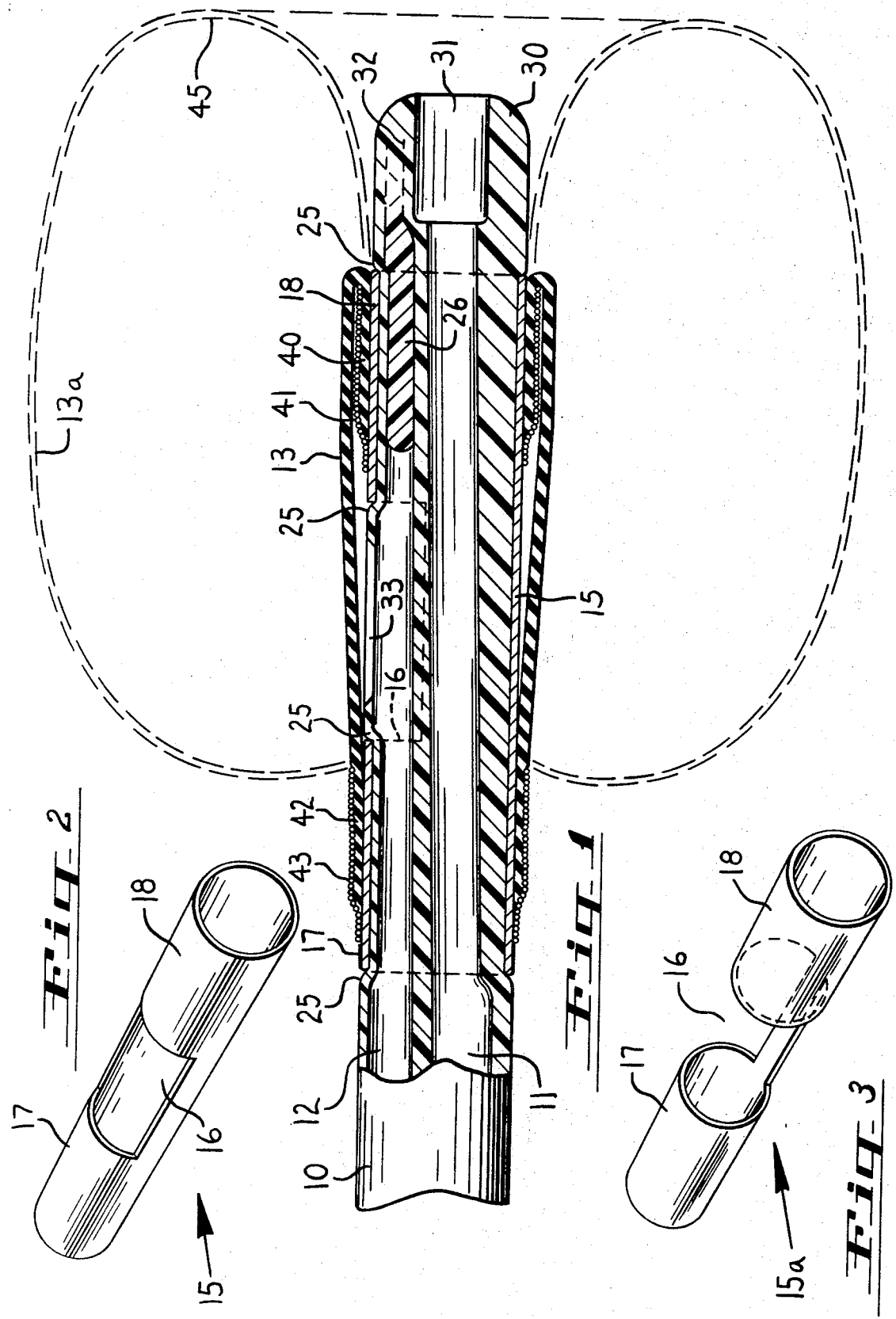

3,833,004

BALLOON CATHETER HAVING SINGLE FERRULE SUPPORT FOR BALLOON BINDINGS

BACKGROUND OF THE INVENTION

This invention relates to a balloon catheter having single ferrule support for balloon bindings which secure the balloon to the catheter tube.

In catheters which are very small in diameter, the balloon cannot be formed by a dipping process as are the balloons on the larger drainage catheters. The most satisfactory balloon construction has proved to be a very thin elastic sleeve secured at its ends to the catheter tube by windings of fine thread. There is a tendency, however, for the plastic in the thin wall sections of a small tube to yield and creep under the pressure of the windings, choking off the lumen or lumens in the tube. This makes it difficult to construct a multi-lumen catheter of small enough size to pass freely through small arteries and veins and especially when the catheter tube is soft and limp as in the case of a flow-directed catheter.

The Blake et al, U.S. Pat. Nos. 3,634,924 and 3,746,003 disclose an improvement comprising a pair of spaced apart rigid metal ferrules arranged to underlie the balloon windings and prevent constriction of the lumen or lumens regardless of how tightly the windings may be applied to the ends of the balloon sleeve. However, it is very difficult to hold two very small ferrules in precise closely spaced positions while the temporarily reduced diameter of the catheter tube is being re-expanded to lock the ferrules in place according to the method of manufacture disclosed in said patents. This problem becomes acute when the catheter tubes are very small and limp and all the parts which must be handled have dimensions which are quite small.

The objects of the present invention are, therefore, to provide an improvement over the form of construction disclosed in said U.S. Pat. Nos. 3,634,924 and 3,746,003 and to provide a balloon catheter having a single ferrule support for constrictive bindings which secure the balloon to the catheter tube.

SUMMARY OF THE INVENTION

In the present construction, catheter tubes are economically produced by extrusion of a thermoplastic material having a memory characteristic. The distal end portion of each tube is heated sufficiently to permit drawing out the tube to reduced diameter. A novel single ferrule is applied over the reduced end portion and this portion of the tube is then heated sufficiently in the absence of any restraint on the tube to reexpand the tube and lock the ferrule in place. The ferrule contains a window opening, allowing one or more balloon inflation openings to be cut through the window opening and through the catheter tube to communicate with a balloon inflation lumen therein.

An elastic sleeve type of balloon is then drawn over the ferrule and bindings are applied to end portions of the sleeve overlying end portions of the ferrule. The plastic material under the ferrule is thus not subject to the binding pressure and does not constrict the lumen or lumens. Catheters of very small size may be made in this manner and this form of construction is of particular advantage in making flow-directed catheters having a soft and limp tube.

The invention will be better understood and additional objects and advantages will become apparent from the following description of the preferred embodiment illustrated on the accompanying drawing. Various changes may be made, however, in the details of construction and arrangement of parts and certain features may be used without others. All such modifications within the scope of the appended claims are included in the invention. The present catheters are not limited to use in veins and arteries but may also be used in the biliary system and elsewhere as will be understood by persons skilled in the art.

BRIEF DESCRIPTION OF THE DRAWING

FIG. 1 is a greatly enlarged longitudinal sectional view showing the distal end of a catheter embodying the invention;

FIG. 2 is a perspective view of the window ferrule in FIG. 1; and

FIG. 3 is a view similar to FIG. 2 showing a ferrule having a larger window opening.

DESCRIPTION OF THE PREFERRED EMBODIMENT

Tube 10 is formed as an extrusion of a suitable thermoplastic material having a memory characteristic such as polyvinyl chloride. This extrusion contains a large through lumen 11 of approximately semi-circular shape in cross section and a small circular balloon inflation lumen 12. The extrusion is cut off to the desired length and the end portion which is to receive the balloon is heated, preferably with hot water, to soften the plastic material. The heated and softened portion of the tube is then drawn by pulling in opposite directions with the fingers, causing the softened portion to neck down to reduced diameter. This drawing step reduces but does not impair the integrity of the lumens 11 and 12.

After the drawing step, the extremity of the tube which was grasped in the fingers is cut off and the single ferrule 15 shown in FIG. 2 is placed on the necked portion. Ferrule 15 is a rigid metal tube, such as stainless steel, having a window opening 16 cut in one side thereof between two circumferential end portions 17 and 18. Ferrule 15 preferably has an outside diameter slightly less than the original diameter of tube 10.

The necked portion of tube 10 is then re-expanded by heating in the absence of any restraint as, for example, by using a radiant heat lamp. In this re-expansion step utilizing the memory characteristic of the plastic, the necked portion of the tube returns to its original diameter except for the portions confined within ferrule 15. Thus, the re-expansion step forms shoulders 25 at the ends of the ferrule and in window opening 16 which securely lock and seal the ferrule in place in indentations in the tube.

The memory characteristic referred to is the result of crystalline structures set up within some of the polymer chains. When such material is heated under tension, these chains tend to untangle and straighten out. As long as the yield point is not exceeded, i.e., the chains are not broken, the material will return to its original form if re-heated and not constrained. One of the advantages of polyvinyl chloride for the present purpose is that it will undergo a great deal of elongation before reaching its yield point.

The re-expansion step just described also restores the lumens 11 and 12 to approximately original size. A cylindrical plug 26 of suitable material such as polyvinyl chloride is secured in lumen 12 by a solvent bonding material. This plug is of sufficient length to extend from the cut end of the tube to a point within the ferrule 15.

Then a tip 30 of suitable configuration is formed on the end of tube 10 having a cylindrical bore 31 communicating with lumen 11. This operation is preferably carried out by a heated die which causes the outer end portion of plug 26 to lose its identity and merge into the material of the tube as indicated by broken lines 32. The method of forming the plastic tube is described and illustrated in greater detail in said prior patents.

One or more balloon inflation openings 33 are then formed in the wall portion of the tube which is exposed in the ferrule window 16, these openings communicating with balloon inflation lumen 12. Openings 33 may be formed as longitudinal slits cut by a rotary cutter.

A distal end portion 40 of the balloon 13 is then secured to end portion 18 of the ferrule by suitable binding means, such as Dacron thread winding 41 and then the rest of the balloon is everted over this winding as shown. Proximal end portion 42 of the balloon sleeve is secured to end portion 17 of the ferrule by a Dacron winding 43. The balloon sleeve 13 in its relaxed position shown in solid lines has an effective length approximately equal to the length of ferrule 15.

When the balloon is inflated, it assumes the shape shown in broken lines at 13a having a fold forming an annular bulge at 45 which preferably projects beyond and, in any event, forms a guard around the tip end 30 of the catheter tube for the purpose explained in said prior patents. Tip 30 is thus contained in a dimple in the end of the balloon as shown.

The catheter illustrated in FIG. 1 is a highly flexible catheter for introduction percutaneously into a peripheral vein for flow guide catheterization of systemic veins, the right heart and pulmonary vessels. The very small diameter of such catheters makes it difficult to properly position a pair of ferrules close together on the catheter tube during the shrinking and expanding manipulations as described in said prior patents. The present single ferrule eliminates the problem of maintaining proper spacing of a pair of ferrules thereby simplifying and reducing the cost of manufacture. The ferrule end portions 17 and 18 which receive windings 43 and 41 maintain the desired relationship to each other at all times since they are integral parts of a single ferrule.

The present invention is not limited to flow guide catheters, however. The single ferrule 15 is also of advantage with the more conventional type of balloon which is not everted at 45 to guard the tip 30. In any case, ferrule end portions 17 and 18 provide a solid backing for the windings 43 and 41 whereby the lumens 11 and 12 are not constricted regardless of the tightness of the windings. These windings may be substantially contained within the indentations in the tube 10 created by the ferrule whereby the balloon portion of the catheter may have approximately the same diameter as the rest of the tube. The present single ferrule may be used on a catheter having only a lumen for balloon inflation but the ferrule is obviously of greatest advantage in a multi-lumen catheter having two or more lumens which must necessarily be very small in cross section.

The ferrule window 16 may be narrowed or widened as desired relative to the configuration shown in FIG. 2. For example, the ferrule 15a in FIG. 3 has a considerably wider window 16 between the circumferential end portions 17 and 18. This configuration would permit a greater number of balloon inflation openings 33 spaced apart circumferentially from each other. A wider window opening also has the advantage of allowing greater re-expansion of the catheter tube between end portions 17 and 18 during assembly so that the ferrule itself does not unduly constrict the lumens 11 and 12.

The proximal end of the catheter tube, not shown, is equipped with the usual fittings providing fluid connections with the lumens 11 and 12. The introduction of balloon inflation fluid under pressure into lumen 12 expands the balloon 13 sufficiently to occlude the body lumen. Lumen 11 may be utilized for injection of therapeutic or diagnostic agents, sampling of a body fluid or pressure monitoring.

Having now described our invention and in what manner the same may be used, what we claim as new and desire to protect by letters Patent is:

1. A balloon catheter comprising a plastic tube having a balloon inflation lumen therein, a rigid ferrule received in and indented in the outer surface of said tube, said ferrule having a window opening in its mid portion between two circumferential end portions, the wall of said tube portion of the inflation lumen having a balloon inflation opening in said window opening of the ferrule communicating with said lumen, an elastic sleeve balloon having opposite end portions overlying said opposite end portions of said ferrule, and constrictive binding means on said end portions of said balloon overlying said end portions of said ferrule on opposite ends of said window opening securing said balloon to the catheter.

2. A catheter as defined in claim 1, said balloon sleeve having an effective length in relaxed condition approximately equal to the length of said ferrule.

* * * * *